United States Patent

Maguire

(10) Patent No.: US 10,910,883 B2
(45) Date of Patent: *Feb. 2, 2021

(54) SYSTEM AND METHOD FOR A VARIABLE IMPEDANCE TRANSMITTER PATH FOR CHARGING WIRELESS DEVICES

(71) Applicant: Facebook, Inc., Menlo Park, CA (US)

(72) Inventor: Yael Maguire, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 15/653,229

(22) Filed: Jul. 18, 2017

(65) Prior Publication Data

US 2017/0317520 A1 Nov. 2, 2017

Related U.S. Application Data

(63) Continuation of application No. 13/648,552, filed on Oct. 10, 2012, now Pat. No. 9,748,790.

(Continued)

(51) Int. Cl.
*H02J 7/02* (2016.01)
*H02J 50/80* (2016.01)
(Continued)

(52) U.S. Cl.
CPC .............. *H02J 50/40* (2016.02); *H02J 7/025* (2013.01); *H02J 50/20* (2016.02); *H02J 50/80* (2016.02); *H04B 5/0037* (2013.01)

(58) Field of Classification Search
CPC .. H02J 50/80; H02J 7/025; H02J 17/00; H02J 50/20; H02J 50/40; H04B 5/0037; Y10T 307/25
See application file for complete search history.

(56) References Cited

U.S. PATENT DOCUMENTS

2009/0153273 A1\* 6/2009 Chen ...................... H02J 50/50
333/219
2010/0190436 A1 7/2010 Cook
(Continued)

FOREIGN PATENT DOCUMENTS

JP 2008011341 A 1/2008
JP 2010252497 A 11/2010
(Continued)

OTHER PUBLICATIONS

Notice of Acceptance for AU Application No. 2013208016, dated Aug. 22, 2017.
(Continued)

*Primary Examiner* — Rexford N Barnie
*Assistant Examiner* — Elim Ortiz
(74) *Attorney, Agent, or Firm* — Van Pelt, Yi & James LLP

(57) ABSTRACT

In one embodiment, a method includes wirelessly coupling a transmitter to a wireless device; determining a first power transfer value of a signal transmitted from the transmitter to the wireless device with a first transmit impedance; determining a second power transfer value of the signal transmitted from the transmitter to the wireless device with a second transmit impedance; and selecting the first transmit impedance based on received power-level information indicating that the first power transfer value is greater than the second power transfer value.

20 Claims, 7 Drawing Sheets

Related U.S. Application Data

(60) Provisional application No. 61/585,697, filed on Jan. 12, 2012.

(51) Int. Cl.
*H02J 50/40* (2016.01)
*H02J 50/20* (2016.01)
*H04B 5/00* (2006.01)

(56) References Cited

U.S. PATENT DOCUMENTS

| | | | |
|---|---|---|---|
| 2011/0037516 A1* | 2/2011 | Nejati | H03F 3/72 330/124 R |
| 2011/0080051 A1* | 4/2011 | Lee | H02J 50/80 307/104 |
| 2011/0109167 A1 | 5/2011 | Park | |
| 2011/0115431 A1 | 5/2011 | Dunworth | |
| 2011/0156490 A1 | 6/2011 | Hwang | |
| 2011/0266880 A1 | 11/2011 | Kim | |
| 2012/0153738 A1* | 6/2012 | Karalis | H02J 5/005 307/104 |

FOREIGN PATENT DOCUMENTS

| | | |
|---|---|---|
| JP | 2011142763 | 7/2011 |
| JP | 2011205788 A | 10/2011 |
| KR | 20070000544 A | 1/2007 |
| KR | 100835057 B1 | 6/2008 |
| WO | WO2011042974 A1 | 4/2011 |

OTHER PUBLICATIONS

Notice of Defects for IL Application No. 233617 (with English translation), dated Aug. 23, 2017.

EP Communication received from EPO for Patent Application No. 13 736 365.1-1202, dated Oct. 22, 2018.

Notice of Allowance for KR Application No. 10-2014-7022023 (with English translation), dated Jan. 17, 2018.

Notification of the Fourth Office Action for CN Application No. 201380005466.4, dated Jan. 30, 2018.

KR Office Action received from KIPO for Patent Application No. 10-2018-7010252. (with English Translation), dated Jul. 5, 2019.

* cited by examiner

SYSTEM AND METHOD FOR A VARIABLE IMPEDANCE TRANSMITTER PATH FOR CHARGING WIRELESS DEVICES

PRIORITY

This application is a continuation under 35 U.S.C. § 120 of U.S. patent application Ser. No. 13/648,552, filed 10 Oct. 2012, which claims the benefit, under 35 U.S.C. § 119(e), of U.S. Provisional Patent Application No. 61/585,697, filed on 12 Jan. 2012, which are incorporated herein by reference.

TECHNICAL FIELD

This disclosure generally relates to charging wireless devices.

BACKGROUND

Conventional wireless communication devices are able to use electromagnetic power generated from a source in close proximity to a device to charge the device. The electromagnetic power may be high or low frequency power. Wireless communication devices typically need large amounts of stored energy, typically 100 mW-hours to 75 Watt-hours, and to effectively charge these devices using wireless methods requires the devices to be within a few millimeters of the source, and requires an antenna on the device to have an area approximately equal to the size of the device. New wireless devices such as Bluetooth Low-Energy headsets, remotes, fitness devices, watches, and medical accessories, and NFC (near field communication) and UHF-RFID (ultra high frequency-radio-frequency identification) cards, labels and sensors, consume much lower amounts of power and have multi-year battery lives or no batteries at all. Convenient mechanisms to power and charge these lower power devices are provided in at least some embodiments described herein.

SUMMARY OF PARTICULAR EMBODIMENTS

According to one aspect, systems and methods are provided to maximize power transfer from one wireless communication device (source) to another (load) in the near and mid-field by more effectively matching the impedance of the source device to the effective impedance presented by the combination of the load device and the transmission path.

DESCRIPTION OF EXAMPLE EMBODIMENTS

Figure 1:
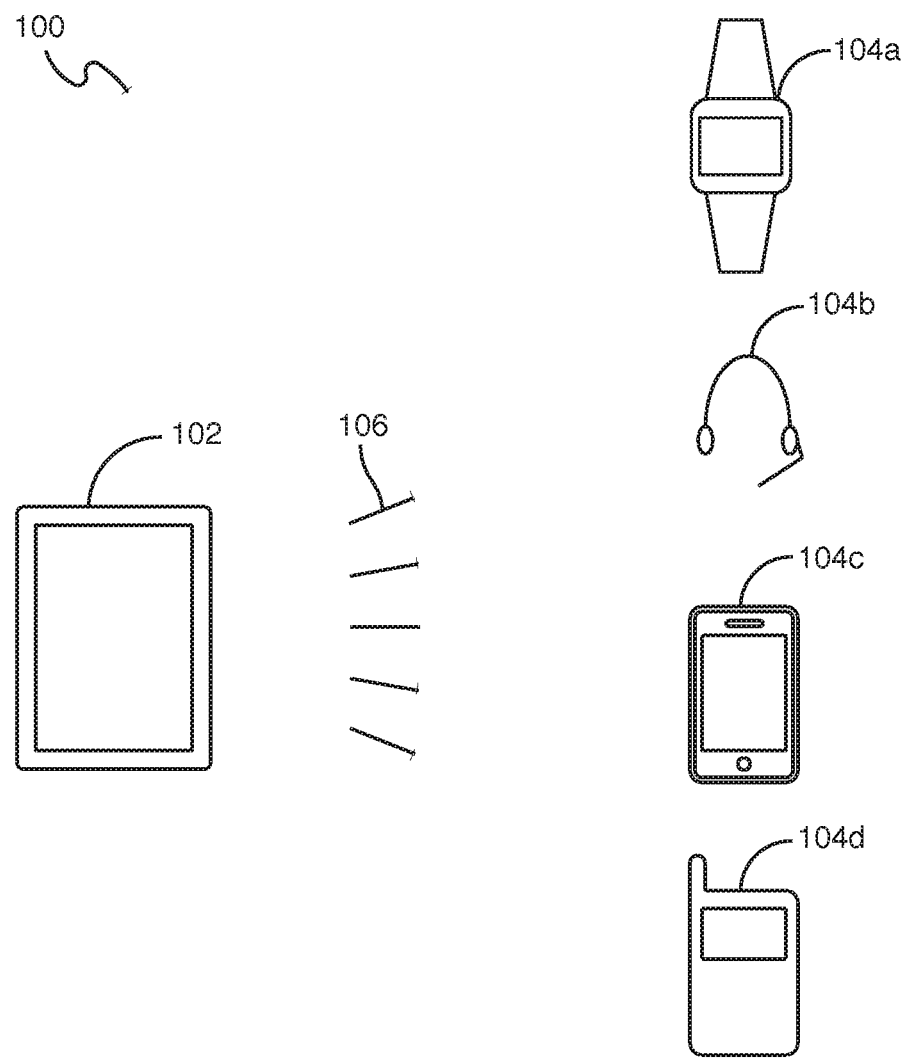
FIG. 1 illustrates an example communications system.

FIG. 1 is a diagram of a communications system 100 in accordance with one embodiment of the invention. The communication system 100 includes a mobile communications base station 102 and multiple wireless communication devices 104a, 104b, 104c and 104d. The base station transmits an RF (radio frequency) signal 106, including RF power. The RF signal 106 is received by the wireless communication devices 104a-104d. According to various embodiments, the wireless communication base station 102 may include one more mobile phones, tablets, personal digital assistants, iPhones, music players, iPods, iPads, laptops, computers, or cameras. The multiple wireless communication devices 104a-104d may be the same device type as the wireless communication base station but may also be headphones, headsets (including a microphone and earphone), watches, heart-rate monitors, diabetic monitors, activity sensors, or toys. According to one embodiment, the base station 102 may be connected to a power source. The power source may be an electrical outlet.

Figure 2:
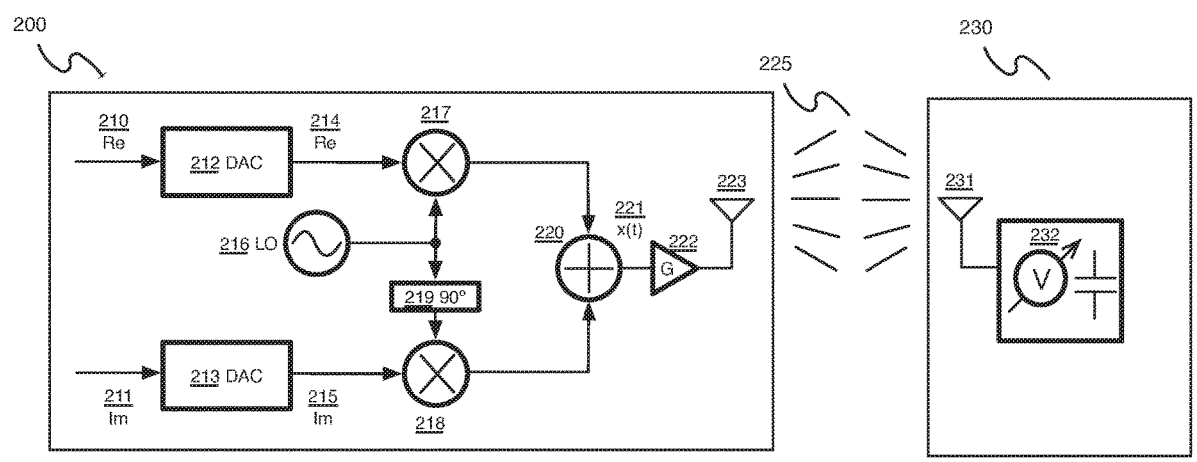
FIG. 2 illustrates an example system for charging a wireless device.

FIG. 2 is a diagram of a typical embodiment of a communications system including a transmitter 200 of a wireless communication base station or device and a power receiver 230 of a second device. The transmitter 200 is a quadrature transmitter and may be the same type of transmitter used for wireless standards such as WiFi, GSM (global system for mobile), 3G, LTE (long term evolution), UHF-RFID, Bluetooth, and WiMax. The quadrature signal includes a real digital data signal component 210 and an imaginary digital data signal component 211. The type of real 210 and imaginary 211 digital data can vary depending on the type of encoding and modulation used. As shown in FIG. 2, the real digital signal component 210 is converted to a real analog signal component 214 at a first digital-to-analog (DAC) converter 212, and the imaginary digital signal component 211 is converted to an imaginary analog signal component 215 at a second digital-to-analog (DAC) converter 213. The real analog signal component 214 is then converted to the radiofrequency (RF) domain via a first mixer 217 and the imaginary analog signal component 215 is converted to the radiofrequency domain via a second mixer 218. According to one embodiment, the real digital signal component 210 and the imaginary digital signal component 211 are both digital signals that need to be converted to analog baseband signals before they are up-converted to the RF domain. The mixers 217 and 218 receive a local oscillator signal from the local oscillator 216, and multiply the local oscillator signal by the respective real and imaginary complex signal components. In one example, the local oscillator signal is in the range of about 2.45 GHz or 5 GHz, used for WiFi or Bluetooth, or another microwave frequency. The real 214 and imaginary 215 analog signal components are combined at 220 to produce the output signal x(t) 221. The output signal x(t) 221 is amplified by amplifier 222. The antenna 223 on the wireless communication base station converts the amplified power and radiates it as an electromagnetic power 225.

The power receiver 230, includes an antenna 231 and a rectifier and power regulation circuit 232. The communication device may be a NFC or UHF-RFID device, or the circuitry from one of these protocols in a larger wireless communication device, and the receiver 230 can be adapted to other frequencies. If the antennas 223 and 231 are sufficiently in range of each other, sufficient power can be transferred to the receiver 230 from the transmitter 200. In one example, the transmitter 200 is a base station and the receiver 230 is a wireless communication device. The amount of power that can be transferred varies substantially with distance between the transmitter and the receiver, and with the wavelength of the transmitter signal. In one example, the transmitted power varies from about 0.001% at 10 m to about 1% at 10 cm.

Figure 3:
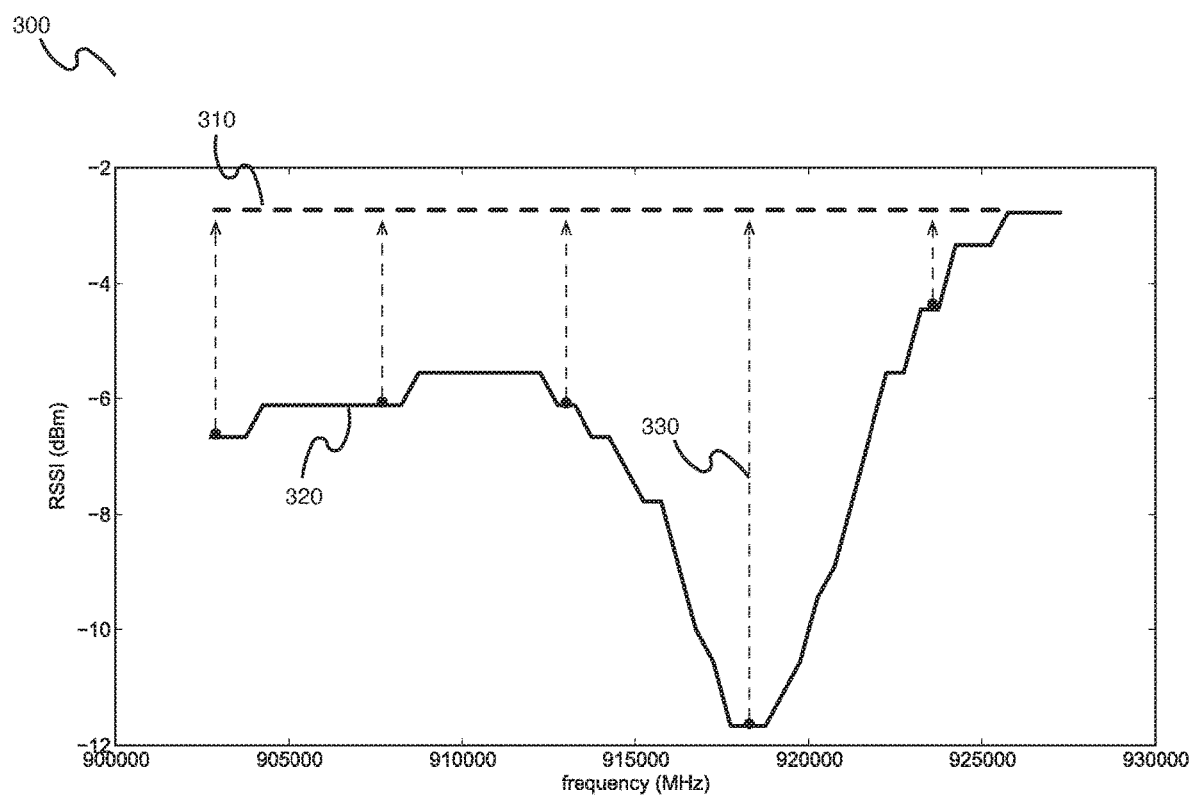
FIG. 3 illustrates an example plot representing the power received at a wireless device.

FIG. 3 is a plot 300 of the power received from a typical receiving device that is 10 cm from a 200 mW UHF transmitter. In one example, the transmitter is a wireless communication base station used to charge a device having a receiver. The units on the y-axis are in dBm. The plot 300 shows that when the receiver is in close proximity to the transmitter, the power transfer to the wireless device can vary substantially, depending on frequency, by greater than 8.9 dB (a factor of about 7.7). For devices that utilize, frequency hopping or selection across the frequency range shown in FIG. 3, the charging time for the devices will also vary by a factor of about 7.7. In at least some systems provided herein, circuitry is designed into at least one of the receiver and the transmitter to move the trace line 320 toward the ideal power versus frequency trace line 310.

Figure 4:
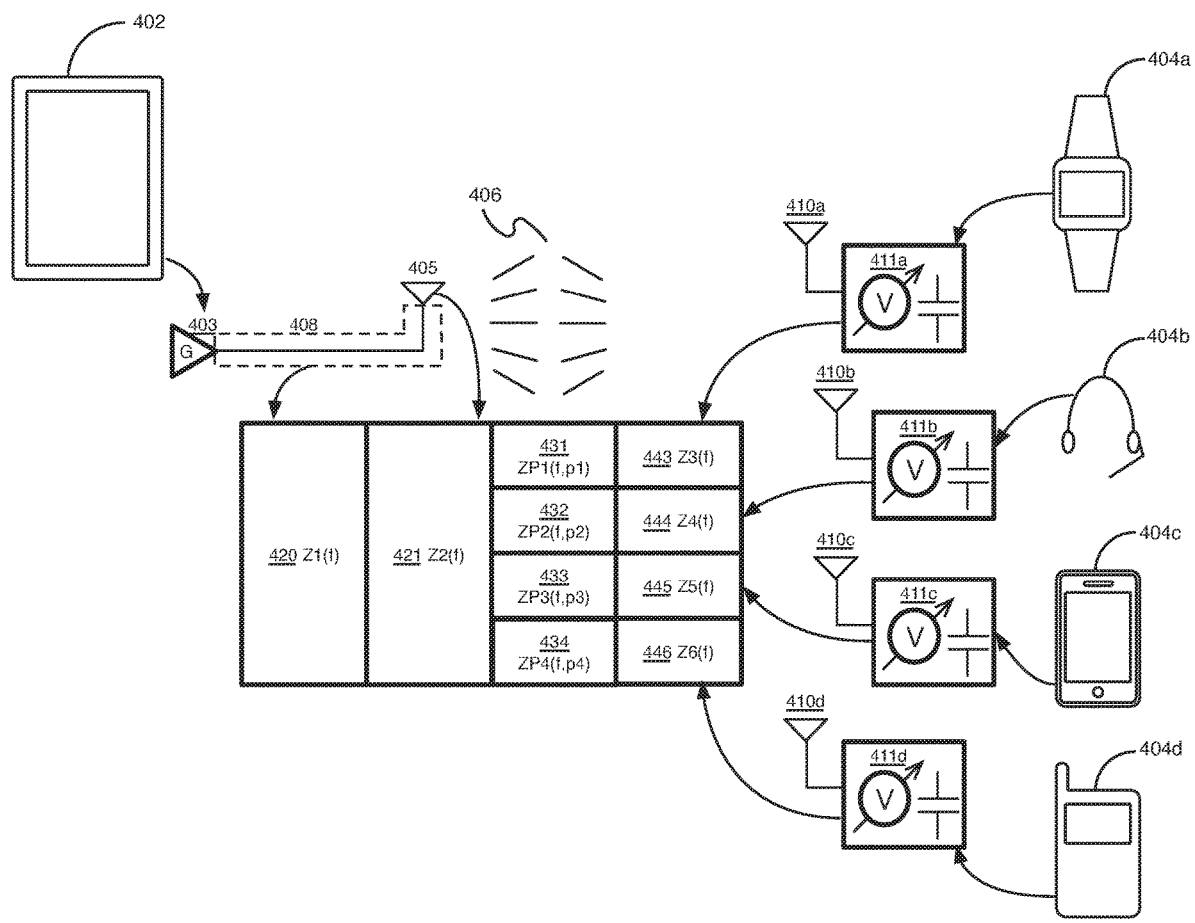
FIG. 4 illustrates an example near-field and mid-field coupling between two wireless devices.

FIG. 4 is a diagram showing near-field and mid-field coupling between a wireless communication base station 402 and wireless communication devices 404a-404d at a specific frequency and spatial orientation. In near-field and mid-field wireless communication, the geometry and impedance of the antennas 405, 410a-410d and circuitry coupled to the antennas 405, 410a-410d affects the transfer of power from the base station 402 to the wireless communication devices 404a-404d. In far-field communication, the impedance of a receiving antenna and corresponding matching circuitry is conjugate matched to the impedance of free space:

$$Z_0 = 1/\varepsilon_0 c; \quad (1)$$

where $\varepsilon_0$ is the permittivity of free-space or approximately $8.854 \times 10^{-12}$, and c is the speed of light (299792458 m/s). Thus, $Z_0$ is approximately 376.7 Ωs. When the impedance connecting a transmitter and receiver is zero (for example, when the transmitter and the receiver are connected with a wire), the impedance of the receiver is approximately the complex conjugate of the transmitter:

$$Z_R(f) = Z_T(f)^* \quad (2)$$

In the near-field and mid-field, the optimal power transfer from the transmitter to the receiver is a combination of the free-space term and transmitter impedances. The wireless communication devices 404a-404d have corresponding impedances Z3 443, Z4 444, Z5 445 and Z6 446. The impedances Z3 443, Z4 444, Z5 445 and Z6 446 are coupled to the impedances of the medium ZP1 431, ZP2 432, ZP3 433 and ZP4 434 between the wireless communication device antennas 410a-410d and the base station antenna 405. The wireless communication base station 402 has two impedances: impedance Z2 421 of the antenna 405, and the impedance Z1 420 of the circuitry leading up to the antenna 405. If the wireless communication devices cannot change their own impedances 443-446, and the impedances 431-434 of the material remain constant, the wireless communication base station 402 can only modify impedance by adjusting its own source impedance Z1 420.

In conventional devices, the source impedance Z1 420 of a base station 402 is usually a static strip line on a printed wiring board (PWB), as shown schematically with dashed line 408. According to one embodiment, systems and methods are provided to replace the static strip line with one or more electrical paths having different impedances or with a single path having a continuously-controllable impedance. In one example, the pair of impedances Z1 420 and Z2 421 to the second device 404b are as matched as possible to impedances ZP1 431 and Z3 443 and the impedance of free-space. The value of Z1 may vary for different devices. With a single antenna 405, each device may be optimally charged in serial, or short time windows could be interleaved to charge multiple devices in a pseudo-simultaneous fashion. It is further noted that the transmitter signal before the amplifier could change the transmitter phase in combination with the impedance selected for Z1 420.

Figure 5:
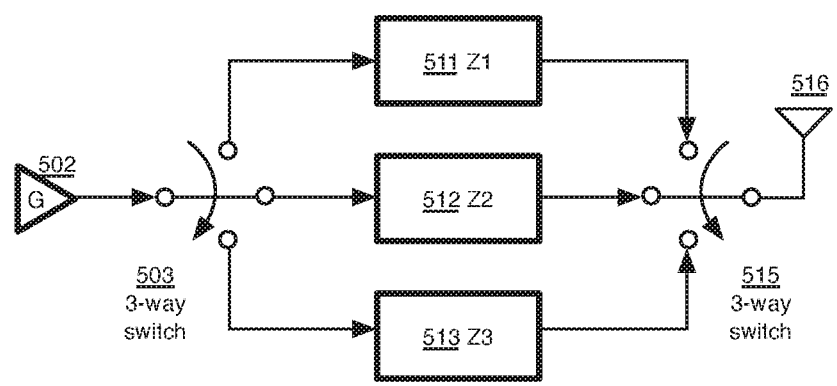
FIG. 5 illustrates an example of adjusting the impedance of a wireless device.

FIG. 5 is a diagram of an embodiment in which the impedance before the antenna 516 of the wireless communication base station can be adjusted to provide efficient transfer of power. Changing the impedance before the antenna 516 may lead to changes in the output signal transmitted by the antenna 516. As shown in FIG. 5, the impedance between the transmitter and the antenna 516 of the wireless communication base station may be changed discretely using a pair of 3-way switches 503, 515 in the path. At each switch position, an impedance 511-513 is designed to be used to test whether the new impedance of the combined system improves or decreases the ability to transfer wireless power from the base station to one of the wireless communications devices. In various embodiments, the switches 503, 515 may have any number of switch positions, and more or less impedance values may be used. In a further embodiment, a mechanism may be utilized to continuously change a network of resistances, capacitances, inductances or any combination thereof to change the impedance of the path.

Figure 6:
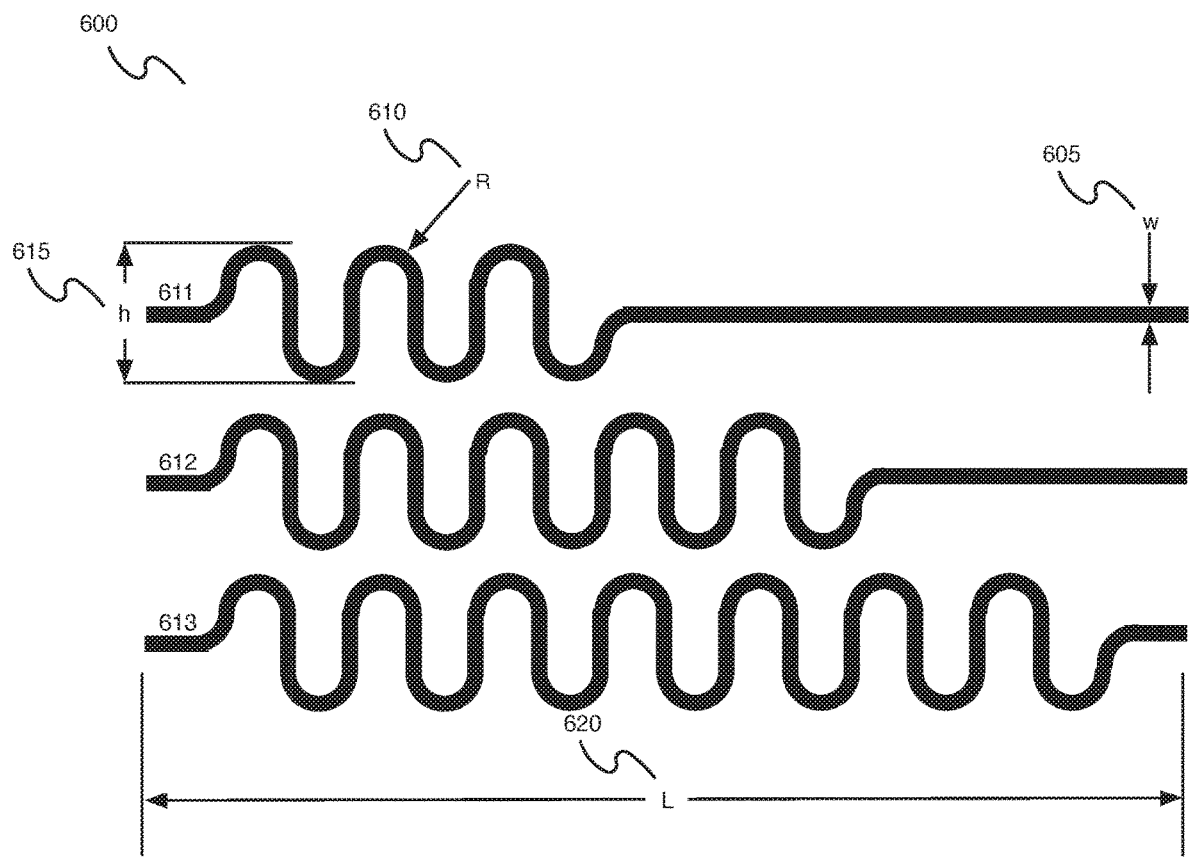
FIG. 6 illustrates an example pattern etched into a layer of a printed wiring board.

FIG. 6 is a diagram showing the layout of a pattern 600 to be etched into a single layer of a printed wiring board (PWB) to implement the three switched impedances shown in FIG. 5, according to one embodiment. The pattern 600 is etched into a single layer of a printed wiring board (PWB) with a corresponding ground plane above or below the pattern 600. When etched, the lines shown in the pattern 600 become stripline transmission lines 611-613 with integrated inductances within the stripline. In one embodiment, the pattern 600 may further have additional shapes corresponding to capacitors. Further impedances may be added with discrete surface mount components or components that are integrated within the substrate. According to one aspect, the width 620 of the striplines 611-613 is selected to correspond to the impedance of the transmitter amplifier 502 and may be adjusted to match the transmitter antenna or a network that connects to the antenna. According to one embodiment, the radius of curvature 610, height 615 and width 620 of the striplines 611-613 are selected to result in predetermined inductances suitable for the selected application.

Figure 7:
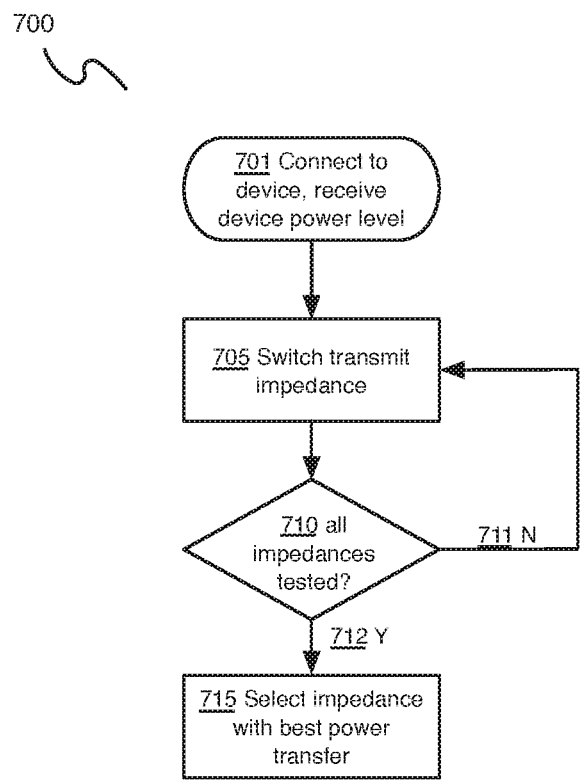
FIG. 7 illustrates an example method for optimizing power transfer when charging a wireless device.

FIG. 7 is a diagram of an embodiment of a method 700 that uses a communication system with a wireless communication base station to optimize power transfer with wireless communication devices. According to one embodiment, in the near and mid-field, the link margin of the ability to communicate with the devices is equal to or substantially higher than the link margin to enable the charging circuitry. According to one example, for passive RFID tags, the link margin of the ability to communicate with an RFID tag is equal to the link margin to enable the charging circuitry. In the near or mid-field, communications link margins are generally between about 80 dB and about 110 dB for battery-based devices, while power-up or charging link margins may have a negative value, as charging circuits need a minimum amount of power to overcome internal leakage, or they may range from about 0 dB up to about 40 dB. Almost all circuits have some amount of current leakage. In practice, it is very hard to make a switch in silicon circuits that can go from low impedance (e.g., a fraction of an Ohm to a few Ohms) to gigaOhms (i.e., nanoAmps). Given that circuit designers care about nanoWatts to microWatts of leakage, to charge a circuit, an amount of current that exceeds the leakage must first be supplied. This is even harder if there is a small microprocessor or logic circuit that must be turned on always to makes sure some state transition occurs (e.g., pressing a button, waking up an AP, etc.), as this leakage may be microWatts to milliWatts. In either case, the charging circuit must overcome this negative "link margin" to actually be able to charge a battery. Since a base station can communicate with wireless communications devices, the base station can use the rectification parameters observed by the wireless communications devices to effectively close the loop of measurement and control by the base station.

At step 701, the wireless communication base station connects to all devices and uses a communications protocol to request information about the power level seen by each device. At step 705, the wireless communication base station switches the transmit impedance 408 to a different impedance, either discretely as shown in FIGS. 5 and 6, or continuously. At step 710, the state machine within the wireless communication base station establishes whether it has tested the full set or space of possible transmit impedances. If not, the transmit impedance is changed to a new value at step 705 and step 710 is repeated. To cover the full set of possible impedances, it may take between a few microseconds and multiple seconds to establish the best power transfer impedance. However, this time is short compared to the overall charging time of minutes to hours. In one example, the transmit phase is incorporated into the algorithm. At step 715, the base station determines which impedance enables the best power transfer. The base station may determine which impedance enable the best power transfer by accepting an impedance that results in a threshold amount of power transfer, or the base station may test all sets of transmit impedances and phases and select the impedance that enables the best power transfer. As has been discussed above, the impedance that is best for one device may be different from the impedance that is optimal for another device. In one embodiment, the various best impedances may be time-sequenced to provide the best power transfer to the set of wireless communication devices.

According to one embodiment, the communication link margin may be high for communication with the wireless communication devices. According to another embodiment, the link margin for the original intended communications application (WiFi network or cellular base station) may be compromised with this algorithm. Thus, in some examples, the transmit impedance may not be set to the optimal value for the wireless communication devices, or the transmit impedance may be time-interleaved with a default value for communication with the networked base station. There may be additional embodiments of communications protocol between multiple wireless communication base stations if they are simultaneously attempting to provide power optimally to the same set of wireless communication devices.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method comprising:
   by a transmitting device, receiving from a wireless device power-level information of a signal transmitted from the transmitting device to the wireless device, wherein the power-level information comprises one or more rectification parameters as measured by the wireless device correlated to a power level of the signal, wherein the power-level information is received through a communication channel between the transmitting device and the wireless device using a communication protocol;
   by the transmitting device, determining, based on the power-level information, a first power transfer value of the signal transmitted from the transmitting device to the wireless device with a first transmit impedance;
   by the transmitting device, determining, based on the power-level information, a second power transfer value of the signal transmitted from the transmitting device to the wireless device with a second transmit impedance;
   by the transmitting device, selecting the first transmit impedance based on the power-level information indicating that the first power transfer value determined based on the power-level information measured by the wireless device and received from the wireless device being provided power from the transmitting device is greater than the second power transfer value determined based on the power-level information measured by the wireless device and received from the wireless device being provided power from the transmitting device;
   wherein selecting the first transmit impedance includes using a switch to select based on the power-level information measured by the wireless device, at least one specific electrical path among a plurality of electrical paths each having a different transmit impedance.

2. The method of claim 1, further comprising, by the transmitting device, determining that the first transmit impedance is not optimal for communication with the mobile device and time-interleaving the first transmit impedance with a different transmit impedance more optimal for communication, wherein the time-interleaving comprising switching at different times between a signal transmission to the wireless device using the first transmit impedance and a signal transmission to the wireless device using the different transmit impedance, and wherein the first transmit impedance corresponds to a higher power transfer value between the first power transfer value and the second power transfer value.

3. The method of claim 1, further comprising
   re-determining the first power transfer value of the signal transmitted from the transmitting device to the wireless device with the first transmit impedance;
   re-determining the second power transfer value of the signal transmitted from the transmitting device to the wireless device with the second transmit impedance; and
   re-selecting one of the first transmit impedance and the second transmit impedance based on the re-determined first power transfer value and the re-determined second power transfer value.

4. The method of claim 3, wherein the transmitting device is a communication device, and wherein the re-selecting one of the first transmit impedance and the second transmit impedance based on the re-determined first power transfer value and the re-determined second power transfer value comprises re-selecting one of the first transmit impedance and the second transmit impedance based on information about power transfer values shared between the wireless device and the communications device having the transmitter.

5. The method of claim 1, further comprising wirelessly charging the wireless device using the first transmit impedance.

6. The method of claim 1, wherein:
the transmitting device further comprises a plurality of electrical paths each having a different impedance.

7. The method of claim 1, wherein:
the transmitting device is a communications device; and
the transmitting device further comprises an electrical path having a continuously-controllable impedance.

8. A transmitting device comprising:
a transmitter configured to transmit a signal to a wireless device; and
processing circuitry coupled to the transmitter and configured to:
receive from the wireless device power-level information of the signal transmitted from the transmitter to the wireless device, wherein the power-level information comprises one or more rectification parameters as measured by the wireless device correlated to a power level of the signal, wherein the power-level information is received through a communication channel between the transmitting device and the wireless device using a communication protocol;
determine, based on the power-level information, a first power transfer value of the signal transmitted from the transmitter to the wireless device with a first transmit impedance;
determine, based on the power-level information, a second power transfer value of the signal transmitted from the transmitter to the wireless device with a second transmit impedance;
select the first transmit impedance based on the power-level information indicating that the first power transfer value determined based on the power-level information measured by the wireless device and received from the wireless device being provided power from the transmitting device is greater than the second power transfer value determined based on the power-level information measured by the wireless device and received from the wireless device being provided power from the transmitting device;
wherein the processing circuitry is configured to select the first transmit impedance including by being configured to use a switch to select based on the power-level information measured by the wireless device, at least one specific electrical path among a plurality of electrical paths each having a different transmit impedance.

9. The transmitting device of claim 8, wherein the processing circuitry is further configured to determine that the first transmit impedance is not optimal for communication with the mobile device and time-interleave the first transmit impedance with a different transmit impedance more optimal for communication, wherein the time-interleaving comprising switching at different times between a signal transmission to the wireless device using the first transmit impedance and a signal transmission to the wireless device using the different transmit impedance, and the first transmit impedance corresponds to a higher power transfer value between the first power transfer value and the second power transfer value.

10. The transmitting device of claim 8, further comprising:
a printed wiring board etched with a plurality of electrical paths, each electrical path having a different transmit impedance, the plurality of electrical paths including one or more passive components for altering a transmit impedance of each electrical path; and
a switch for selecting, from the plurality of electrical paths, a specific electric path.

11. The transmitting device of claim 8, wherein the transmitter comprises:
a first digital-to-analog converter configured to convert a real digital signal to a real analog signal;
a second digital-to-analog converter configured to convert an imaginary digital signal to an imaginary analog signal;
a first mixer configured to convert the real analog signal into a radiofrequency (RF) domain for controlling an RF phase of the signal transmitted to the wireless device; and
a second mixer configured to convert the imaginary analog signal into the RF domain for controlling the RF phase of the signal transmitted to the wireless device.

12. The transmitting device of claim 8, further comprising one or more antennas for coupling the transmitter to the wireless device, wherein the one or more antennas are shared with other communications functions of the transmitting device.

13. A computer-readable non-transitory storage media embodying software when executed by a transmitting device to:
receive from a first wireless device power-level information of a signal transmitted from the transmitting device to the first wireless device, wherein the power-level information comprises one or more rectification parameters as measured by the wireless device correlated to a power level of the signal, wherein the power-level information is received through a communication channel between the transmitting device and the first wireless device using a communication protocol;
determine, based on the power-level information, a first power transfer value of the signal transmitted from the transmitting device to the first wireless device with a first transmit impedance;
determine, based on the power-level information, a second power transfer value of the signal transmitted from the transmitting device to the first wireless device with a second transmit impedance;
select the first transmit impedance based on the power-level information indicating that the first power transfer value determined based on the power-level information measured by the wireless device and received from the wireless device being provided power from the transmitting device is greater than the second power transfer value determined based on the power-level information measured by the wireless device and received from the wireless device being provided power from the transmitting device;
wherein selecting the first transmit impedance includes using a switch to select based on the power-level information measured by the wireless device, at least one specific electrical path among a plurality of electrical paths each having a different transmit impedance.

14. The media of claim 13, further embodying software operable when executed to determine that the first transmit impedance is not optimal for communication with the mobile device and time-interleave the first transmit impedance with a different transmit impedance more optimal for communication, wherein the time-interleaving comprising switching at different times between a signal transmission to the wireless device using the first transmit impedance and a signal transmission to the wireless device using the different transmit impedance, and wherein: the first transmit impedance corresponds to a higher power transfer value between the first power transfer value and the second power transfer value.

15. The media of claim 13, further embodying software operable when executed to:
re-determine the first power transfer value of the signal transmitted from the transmitting device to the wireless device with the first transmit impedance;
re-determine the second power transfer value of the signal transmitted from the transmitting device to the wireless device with the second transmit impedance; and
re-select a transmit impedance of the first transmit impedance and the second transmit impedance based on the re-determined first power transfer value and the re-determined second power transfer value.

16. The media of claim 13, further embodying software operable when executed to:
wirelessly charge the first wireless device by the transmitting device using the first transmit impedance selected for the first wireless device.

17. The media of claim 16, wherein the transmitting device comprises:
a printed wiring board etched with the plurality of electrical paths.

18. The media of claim 16, wherein the transmitting device comprises an electrical path having a continuously-controllable transmit impedance.

19. The media of claim 14, wherein a first time window allocated to the first wireless device for charging is interleaved to a second time window allocated to a second wireless device being charged by the transmitting device.

20. The media of claim 14, further embodying software operable when executed to charge a plurality of wireless devices using a plurality of transmit impedances in a time-sequenced order.

* * * * *